(12) United States Patent
Satsukawa

(10) Patent No.: US 7,096,146 B2
(45) Date of Patent: Aug. 22, 2006

(54) TEMPERATURE ADAPTIVE CIRCUIT, CIRCUIT TEMPERATURE RAISING METHOD AND CIRCUIT TEMPERATURE RAISING PROGRAM

(75) Inventor: Yoshihiko Satsukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/933,435

(22) Filed: Sep. 3, 2004

(65) Prior Publication Data
US 2005/0288887 A1    Dec. 29, 2005

(30) Foreign Application Priority Data
May 27, 2004    (JP)    ............................. 2004-157009

(51) Int. Cl.
G01K 1/08    (2006.01)
G06F 15/00    (2006.01)
(52) U.S. Cl. ...................................... 702/132
(58) Field of Classification Search ................ 702/132
See application file for complete search history.

(56) References Cited

U.S. PATENT DOCUMENTS
5,955,907 A * 9/1999 Niijima ...................... 327/262

FOREIGN PATENT DOCUMENTS
JP    06-201780    * 7/1994

* cited by examiner

*Primary Examiner*—John Barlow
*Assistant Examiner*—Sujoy Kundu
(74) *Attorney, Agent, or Firm*—Staas & Halsey LLP

(57) ABSTRACT

A temperature adaptive circuit is provided which can perform an ordinary operation of an LSI circuit in a predetermined temperature range by raising the temperature of the LSI circuit up to the predetermined temperature range. The temperature adaptive circuit includes the LSI circuit that selectively performs, based on an instruction, an ordinary operation, which is an operation in a temperature range where the LSI circuit operates normally, or a temperature rise operation, which is an operation of raising the temperature of the LSI circuit to the predetermined temperature range, and a motion control section that outputs an instruction for either of said ordinary operation and said temperature rise operation to said LSI circuit.

4 Claims, 8 Drawing Sheets

TEMPERATURE ADAPTIVE CIRCUIT, CIRCUIT TEMPERATURE RAISING METHOD AND CIRCUIT TEMPERATURE RAISING PROGRAM

BACKGROUND OF THE INVENTION

1. Field of the Invention

The present invention relates to a temperature adaptive circuit, a circuit temperature raising method and a circuit temperature raising program capable of operating a circuit such as an LSI circuit, etc., in a temperature range in which the circuit operates normally even at the time when power is turned on or the like.

2. Description of the Related Art

In recent years, in high performance LSI (Large Scale Integrated) circuits, power consumption is increasing in accordance with higher clock frequencies and increased transistor current, so the temperature of an LSI chip during its operation becomes generally about 30–70 degrees in centigrade. In addition, changes in transistor characteristics and in wiring resistances take place in accordance with a change in the temperature of the chip, so operation timing inside the chip is caused to change. Thus, it is necessary to design the chip in such a manner that the chip can operate normally in the entire temperature range estimated.

Here, note that for example, a first patent document (Japanese patent application laid-open No. H6-201780 (pages 3–4 and FIG. 1)) is cited as a prior art document relevant to the present invention. An integrated circuit disclosed in the first patent document has a function of making its testing easy or simple.

However, considering when the chip is in operation, a temperature rise more than a certain degree of the chip is expected due to the operation thereof, whereas considering when the chip starts to operate, the chip temperature is low due to the low temperature of ambient air. Thus, it is necessary for the chip to operate normally in both of these cases. Here, a problem arises in that when a delay is increased so as to permit the chip to operate normally at its low temperatures, i.e., in a state where the chip can operate at high speed, an upper limit for the operation speed of the chip is suppressed and at the same time the man-hour of a countermeasure against racing is increased, too.

SUMMARY OF THE INVENTION

The present invention has been made to solve the problem as referred to above, and is intended to provide a temperature adaptive circuit, a circuit temperature raising method and a circuit temperature raising program which can raise the temperature of a circuit such as an LSI circuit up to a predetermined temperature range so as to permit the circuit to operate normally in the predetermined temperature range.

In order to solve the above-mentioned problems, in one aspect, the present invention resides in a temperature adaptive circuit comprising: a circuit that selectively performs, based on an instruction, an ordinary operation, which is an operation in a temperature range where a normal operation is possible, or a temperature rise operation, which is an operation of raising its a temperature; and a motion control section that outputs an instruction for either of the ordinary operation and the temperature rise operation to the circuit. Here, note that the circuit of the present invention corresponds to a large scale integrated (LSI) circuit 1 in embodiments of the present invention, and the motion control section of the present invention corresponds to a temperature rise control section 2 in embodiments of the present invention. In addition, the ordinary operation is an operation of the circuit to perform its proper or intrinsic function, and it is a scanning operation in the case where the circuit is a scan chain as in embodiments of the present invention.

Preferably, in the temperature adaptive circuit according to the present invention, the above-mentioned circuit includes: a pattern generation section that generates a data pattern for the temperature rise operation; a selector that is input with the data pattern output by the pattern generation section as a first input, and with a data pattern for the ordinary operation input thereto from the outside as a second input, so that the first input and the second input are switched from each other in accordance with an instruction from the outside; a switching control section that switches the selector in accordance with an instruction from the motion control section; a scanning chain that operates a plurality of flip flops based on an output of the selector; and a temperature measuring section that measures the temperature of the circuit, and outputs it to the motion control section. Here, note that the pattern generation section of the present invention corresponds to a pattern generation section 11, or a connecting line 15, or a scramble section 16 in embodiments of the present invention. Also, the switching control section corresponds to a scan control section 4.

Preferably, in the temperature adaptive circuit according to the present invention, the pattern generation section outputs a data pattern of the output of the scan chain. Here, note that the pattern generation section of the present invention corresponds to a connecting line 15 in embodiments of the present invention.

Preferably, in the temperature adaptive circuit according to the present invention, the switch control section switches the selector into the second input when the motion control section instructs the termination of the temperature rise operation and when the number of scan shifts of the scan chain becomes N (N is an integer) times the number of scan bits of the scan chain.

Preferably, in the temperature adaptive circuit according to the present invention, the pattern generation section outputs data pattern, in which a bit is inverted once per two bits, in response to an output of the scan chain. Here, note that the pattern generation section of the present invention corresponds to a scramble section 16 in embodiments of the present invention.

Preferably, in the temperature adaptive circuit according to the present invention, in case of the number of scan bits being an even number, the switching control section switches the selector into the second input when the motion control section instructs the termination of the temperature rise operation and when the number of scan bits of the scan chain becomes 2N (N is an integer) times the number of scan shifts of the scan chain.

Preferably, in the temperature adaptive circuit according to the present invention, in the case of the number of scan bits being an odd number, the switching control section switches the selector into the second input when the motion control section instructs the termination of the temperature rise operation and when the number of scan bits of the scan chain becomes 4N (N is an integer) times the number of scan shifts of the scan chain.

Preferably, in the temperature adaptive circuit according to the present invention, the scan chain inserts a dummy flip flop for outputting a fixed value into the flip flops at a position thereof at which there is a high probability of a specific data pattern.

In another aspect, the present invention resided in a circuit temperature raising method for raising the temperature of a circuit by using a scan chain, the method comprising: a temperature rise operation step for performing a temperature rise operation by inputting a first data pattern to the scan chain when power is turned on; a temperature detection step for detecting the temperature of the circuit; and an ordinary operation step for performing an ordinary operation by inputting a second data pattern to the scan chain when it is detected in the temperature detection step that the temperature is higher than a predetermined value.

In a preferred embodiment of the present invention, there is provided a circuit temperature raising method for raising the temperature of a circuit by using a scan chain, the method comprising: a first temperature detection step for detecting when the temperature of the circuit is lower than or equal to a predetermined value; and a temperature rise operation step for performing a temperature rise operation by inputting a first data pattern to the scan chain when it is detected in the first temperature detection step that the temperature of the circuit is lower than or equal to the predetermined value.

Preferably, the above-mentioned circuit temperature raising method further comprises: a second temperature detection step for detecting when the temperature of the circuit is higher than the predetermined value; and an ordinary operation step for performing an ordinary operation by inputting a second data pattern to the scan chain when it is detected in the second temperature detection step that the temperature is higher than the predetermined value.

In a further aspect, the present invention resides in a circuit temperature raising program serving to make a computer execute a circuit temperature raising method for raising the temperature of a circuit by using a scan chain, the circuit temperature raising program being adapted to make the computer execute: a temperature rise operation step for performing a temperature rise operation by inputting a first data pattern to the scan chain when power is turned on; a temperature detection step for detecting the temperature of the circuit; and an ordinary operation step for performing an ordinary operation by inputting a second data pattern to the scan chain when it is detected in the temperature detection step that the temperature is higher than a predetermined value.

In a preferred embodiment of the present invention, there is provided a circuit temperature raising program serving to make a computer execute a circuit temperature raising method for raising the temperature of a circuit by using a scan chain, the circuit temperature raising program being adapted to make the computer execute: a first temperature detection step for detecting when the temperature of the circuit is lower than or equal to a predetermined value; and a temperature rise operation step for performing a temperature rise operation by inputting a first data pattern to the scan chain when it is detected in the first temperature detection step that the temperature of the circuit is lower than or equal to the predetermined value.

Preferably, the above-mentioned circuit temperature raising program is adapted to make the computer execute: a second temperature detection step for detecting when the temperature of the circuit is higher than the predetermined value; and an ordinary operation step for performing an ordinary operation by inputting a second data pattern to the scan chain when it is detected in the second temperature detection step that the temperature is higher than the predetermined value.

Here, note that the above-mentioned program can be stored in a computer readable recording medium, so that it can be executed by a computer that constitutes a temperature adaptive circuit. Also, the computer readable recording medium includes a portable storage medium such as a CD-ROM, a flexible disk, a DVD disk, a magneto-optical disk, an IC card or the like, or a database that holds therein computer programs, or another computer and its database, or a transmission medium on a communication line.

According to the present invention, a lower limit for a temperature range that ensures the normal operation of an LSI circuit can be made higher by performing the normal operation thereof after the LSI circuit is caused to rise to a predetermined temperature. Further, when the lower limit for the temperature range of the LSI circuit is made higher, a necessary delay need not be increased at low temperatures, so the LSI circuit is able to perform a high speed operation.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings.

Embodiment 1

In a first embodiment of the present invention, reference will be made to a temperature adaptive circuit that serves to raise the temperature of an LSI circuit when the temperature of the LSI circuit is low such as when power is turned on or the like, and thereafter to permit the LSI circuit to perform an ordinary operation.

Figure 1:
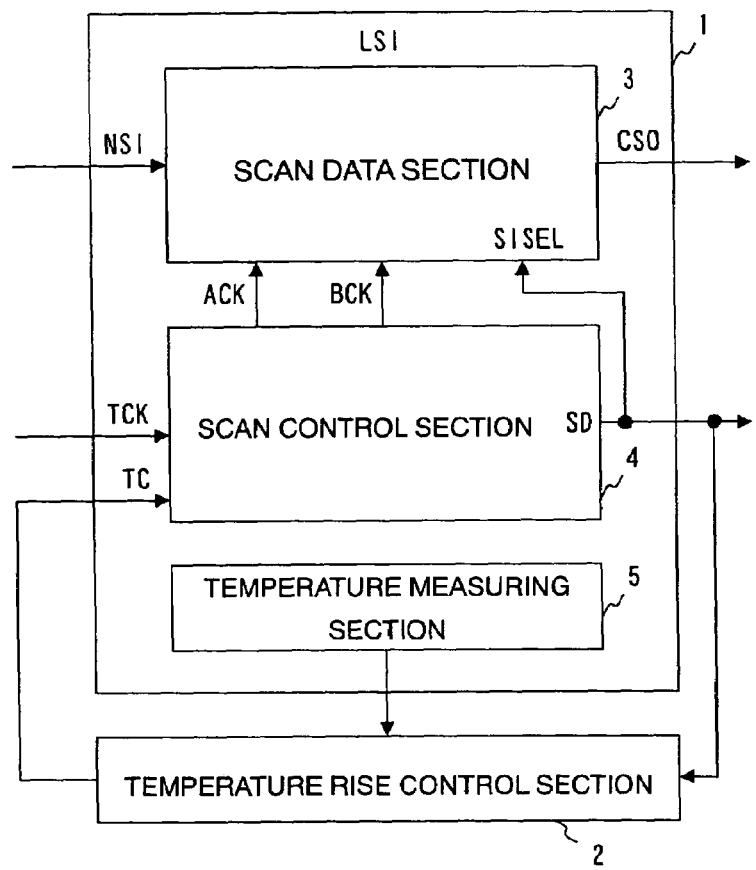
FIG. 1 is a block diagram showing one example of the configuration of a temperature adaptive circuit according to a first embodiment of the present invention.

FIG. 1 is a block diagram that shows the configuration of a temperature adaptive circuit according to the first embodiment of the present invention. As shown in FIG. 1, the temperature adaptive circuit is comprised of an LSI circuit 1 and a temperature rise control section 2. In addition, the LSI circuit 1 includes a scan data section 3, a scan control section 4, and a temperature measuring section 5. The scan control section 4 constitutes a switching control section according to the present invention. The temperature measuring section 5 is comprised of a thermal diode for example, and outputs the result of temperature measurement to the temperature rise control section 2. The temperature rise control section 2 constitutes a motion control section according to the present invention that serves to switch between a temperature rise operation and an ordinary operation in accordance with an output of the temperature measuring section 5.

Figure 2:
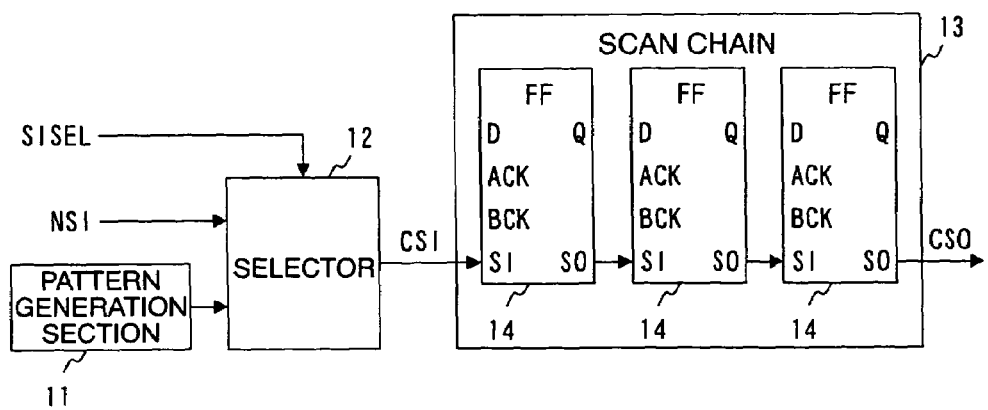
FIG. 2 is a block diagram showing one example of the configuration of a scan data section according to the first embodiment of the present invention.

Next, reference will be made to the scan data section 3. FIG. 2 is a block diagram that shows one example of the configuration of the scan data section according to the first embodiment of the present invention. As shown in FIG. 2, the scan data section 3 includes a pattern generation section 11, a selector 12 and a scan chain 13.

The scan chain 13 is comprised of a plurality of FFs (flip flops) 14. Each of the FFs 14 is a scan FF used for ease of test design, and it is provided with terminals for an A-clock signal ACK, a B-clock signal BCK, a scan input data signal SI and a scan output data signal SO, in addition to terminals for an input data signal D and an output data signal Q which are terminals of an ordinary FF. A pulse of the signal ACK represents the input timing of the signal SI, and a pulse of the signal BCK represents the output timing of the signal SO. The signals SI and SO of all the FFs 14 are connected with one another in a moniliform or beaded manner so as to form the scan chain. Here, note that a signal SI for the first FF 14 of the scan chain is referred to as a scan chain input data signal CSI, and a signal SO for the last FF 14 of the scan chain as a scan chain output data signal CSO.

Hereinafter, reference will be made to the pattern generation section 11. The pattern generation section 11 generates a predetermined bit pattern (first data pattern) comprising 0s and 1s. The selector 12 selects either of a signal NSI (second data pattern), which is an ordinary scan chain input data signal, and the output of the pattern generation section 11 in accordance with a scan input data selection signal SISEL input from the outside, and passes it to the scan chain 13 as a scan chain input data signal CSI.

Figure 3:
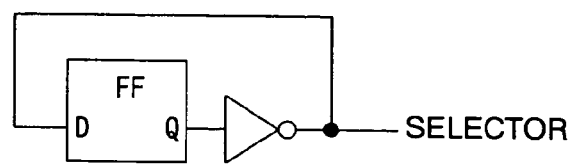
FIG. 3 is a block diagram showing one example of the configuration of a pattern generation section according to the first embodiment of the present invention.

FIG. 3 is a block diagram that shows one example of the configuration of the pattern generation section according to the first embodiment of the present invention. The pattern generation section shown in FIG. 3 alternately outputs "0" and "1".

Figure 4:
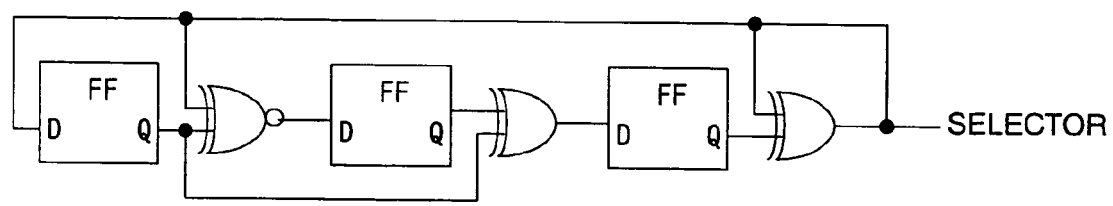
FIG. 4 is a block diagram showing another example of the configuration of the pattern generation section according to the first embodiment of the present invention.

FIG. 4 is a block diagram that shows another example of the configuration of the pattern generation section according to the first embodiment of the present invention. The pattern generation section shown in FIG. 4 generates pseudo random numbers. Specifically, if it is configured so as to have FFs of K stages, the pattern generation section generates pseudo random numbers with a cycle of $2^{K}-1$.

Figure 5:
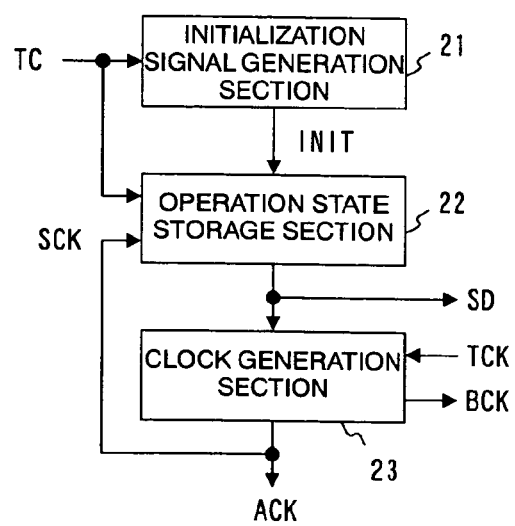
FIG. 5 is a block diagram showing one example of the configuration of a scan control section according to the first embodiment of the present invention.

Hereinbelow, reference will be made to the scan control section 4. FIG. 5 is a block diagram that shows one example of the configuration of the scan control section according to the first embodiment of the present invention. As shown in FIG. 5, the scan control section 4 includes an initialization signal generation section 21, an operation state storage section 22 and a clock generation section 23.

Figure 6:
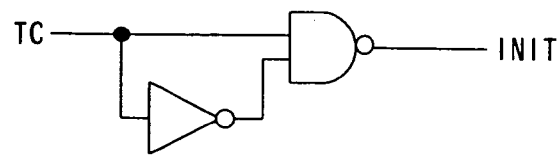
FIG. 6 is a block diagram showing one example of the configuration of an initialization signal generation section according to the first embodiment of the present invention.

The initialization signal generation section 21 generates an initialization signal INIT based on a temperature rise operation signal TC, as shown in FIG. 6, and passes it to the operation state storage section 22. FIG. 6 is a block diagram that shows one example of the configuration of the initialization signal generation section according to the first embodiment of the present invention.

Figure 7:
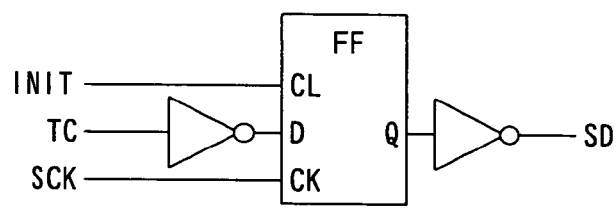
FIG. 7 is a block diagram showing one example of the configuration of an operation state storage section according to the first embodiment of the present invention.

The operation state storage section 22 is comprised of an FF and an NOT, as shown in FIG. 7, and generates a scan shift completion signal SD based on the initialization signal INIT, the temperature rise operation signal TC and a clock signal SCK, and passes it to the clock generation section 22 and the temperature rise control section 2 as well as to the scan data section 3 as a scan input data selection signal SISEL. FIG. 7 is a block diagram that shows one example of the configuration of the operation state storage section according to the first embodiment of the present invention.

Figure 8:
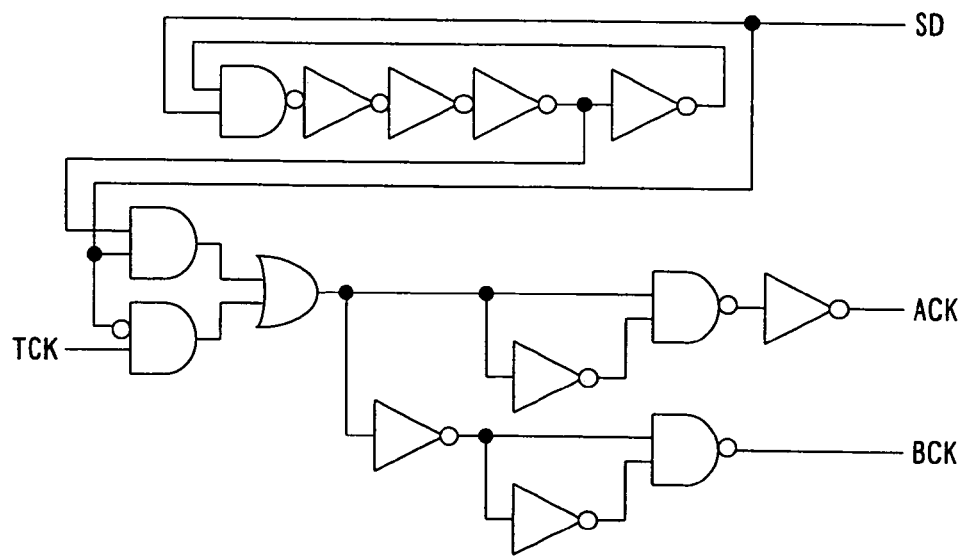
FIG. 8 is a block diagram showing one example of the configuration of a clock generation section according to the first embodiment of the present invention.

The clock generation section 23 generates an A-clock signal ACK and a B-clock signal BCK based on the scan shift completion signal SD and a test clock signal TCK, as shown in FIG. 8. The A-clock signal ACK is passed to the scan data section 3, and at the same time to the operation state storage section 22 as a clock signal SCK. The B-clock signal BCK is passed to the scan data section 3. FIG. 8 is a block diagram that shows one example of the configuration of the clock generation section according to the first embodiment of the present invention.

Figure 9:
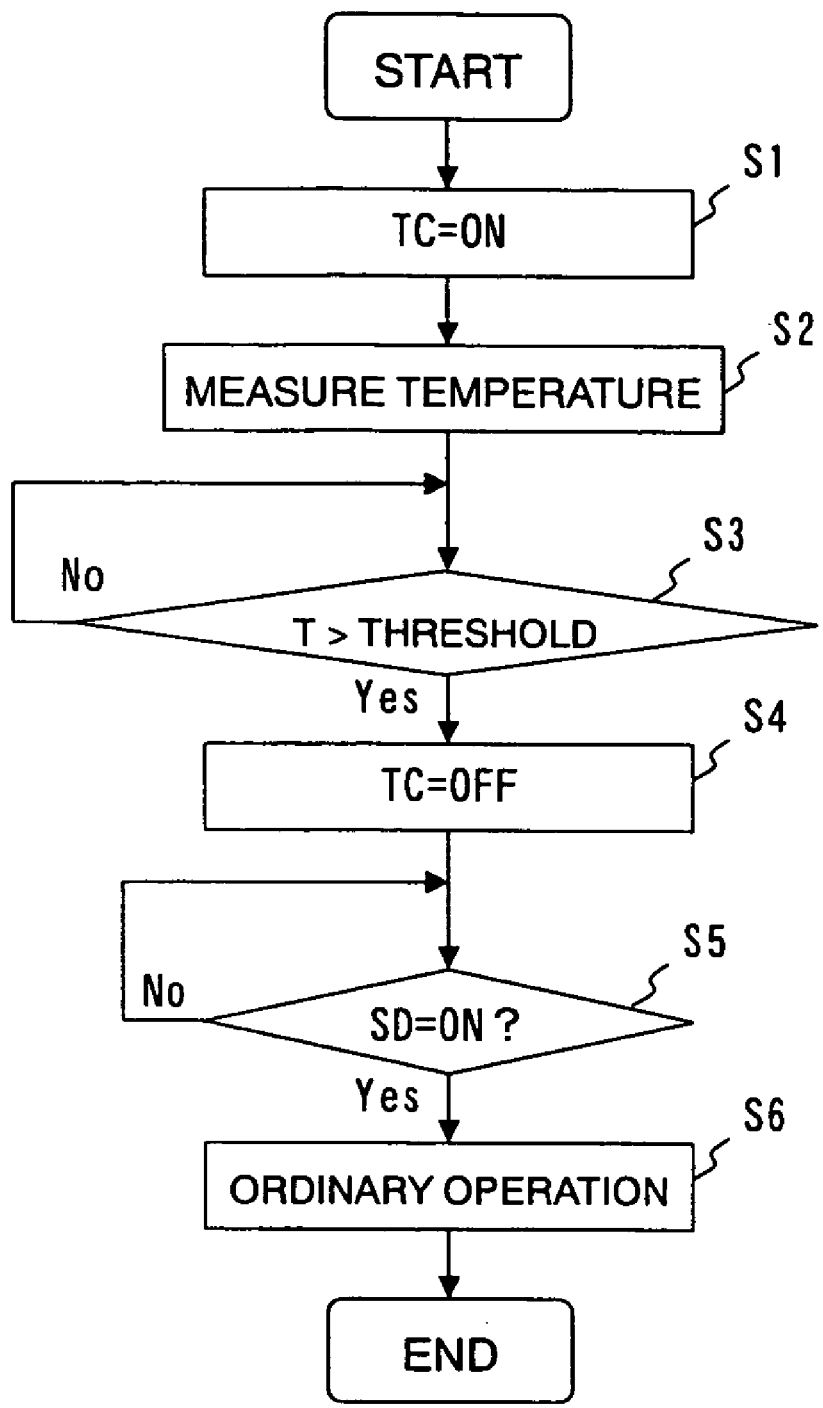
FIG. 9 is a flow chart showing one example of the operation of a temperature rise control section according to the first embodiment of the present invention.

Hereinafter, reference will be made to the temperature rise control section 2. FIG. 9 is a flow chart that shows one example of the operation of the temperature rise control section according to the first embodiment of the present invention. The temperature rise control section 2 starts this flow when a RESET signal is input thereto such as when power is turned on. First of all, the temperature rise control section 2 outputs to the scan control section 4 a temperature rise operation signal TC=ON representing that a temperature rise operation is to be carried out (S1). Then, the temperature T of the LSI circuit is measured by using the output of the temperature measuring section 5 (S2).

Subsequently, a determination is made as to whether the temperature T has exceeded a predetermined threshold (S3). When the temperature T has not exceeded the threshold (S3, No), a return is performed to the processing in S3 where the temperature rise operation is continued. On the other hand, when the temperature T has exceeded the threshold (S3, Yes), a temperature rise operation signal TC=OFF is output to the scan control section 4 (S4). Thereafter, a determination is made as to whether the scan shift completion signal SD input from the scan control section 4 is ON (S5). When it is determined as SD=OFF (S5, No), a return to the processing in S5 is carried out, whereas when it is determined as SD=ON (S5, Yes), the operation of the LSI circuit is switched to the ordinary operation (S6) and this flow is terminated. Here, note that instead of the above operation, the temperature may be first measured upon power being turned on, and when the result of the measurement has not exceeded a predetermined threshold T, a temperature rise operation may be carried out. It is needless to say that the temperature rise control section, though can be constituted as hardware, may be constituted by a CPU and a software that makes the CPU execute an operation of raising the temperature of the above-mentioned circuit.

In the temperature rise operation, each of signal transmission paths is switched over by scan shifting a pattern that is output by the pattern generation section 11. Charging or discharging is carried out in a gate that has been switched, whereupon an amount of energy corresponding to its load capacity and a voltage applied thereto is consumed to raise the temperature thereof. Accordingly, in a subsequent ordinary operation, the LSI circuit 1 can operate at temperatures higher than the predetermined temperature.

Embodiment 2

In a second embodiment of the present invention, consideration is given to the case where an LSI circuit uses a power saving mode. Upon restoration from the power saving mode, it is necessary for the LSI circuit to hold its internal state. Accordingly, reference will be made to a temperature adaptive circuit that serves to reproduce the internal state of the LSI circuit prior to its temperature rise operation after the temperature rise operation has been done.

Figure 10:
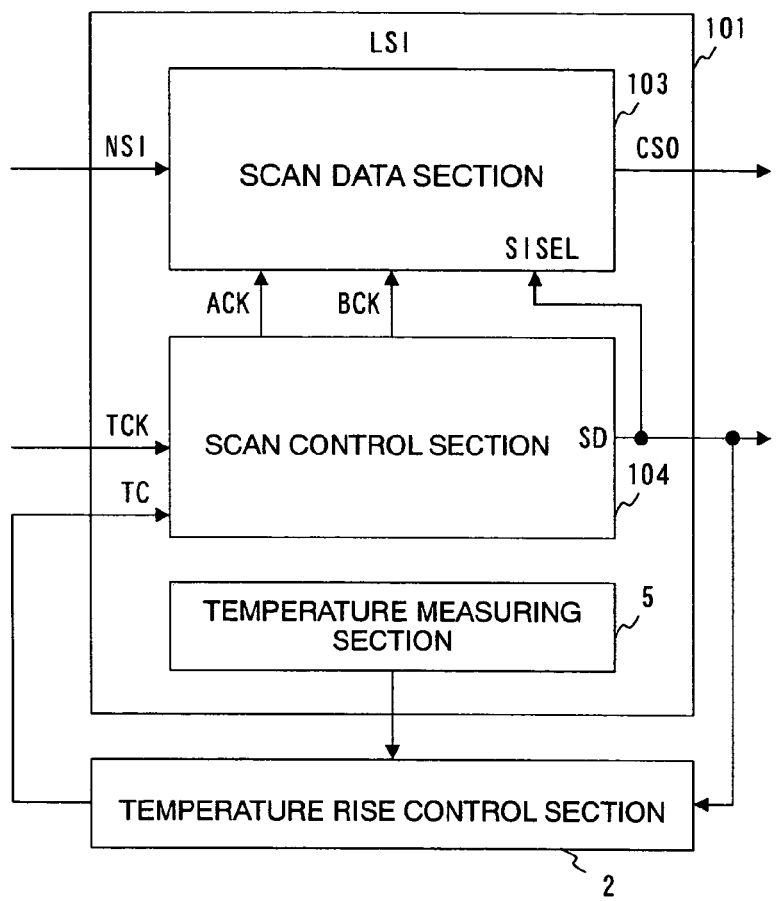
FIG. 10 is a block diagram showing one example of the configuration of a temperature adaptive circuit according to a second embodiment of the present invention.

FIG. 10 is a block diagram that shows one example of the configuration of a temperature adaptive circuit according to the second embodiment of the present invention. In FIG. 10, the same symbols as those in FIG. 1 designate the same or corresponding parts shown in FIG. 1, and an explanation thereof is omitted here. In the second embodiment of the present invention, an LSI circuit 101 is provided instead of the LSI circuit 1; a scan data section 103 is provided instead of the scan data section 3; and a scan control section 104 is provided instead of the scan control section 4.

Figure 11:
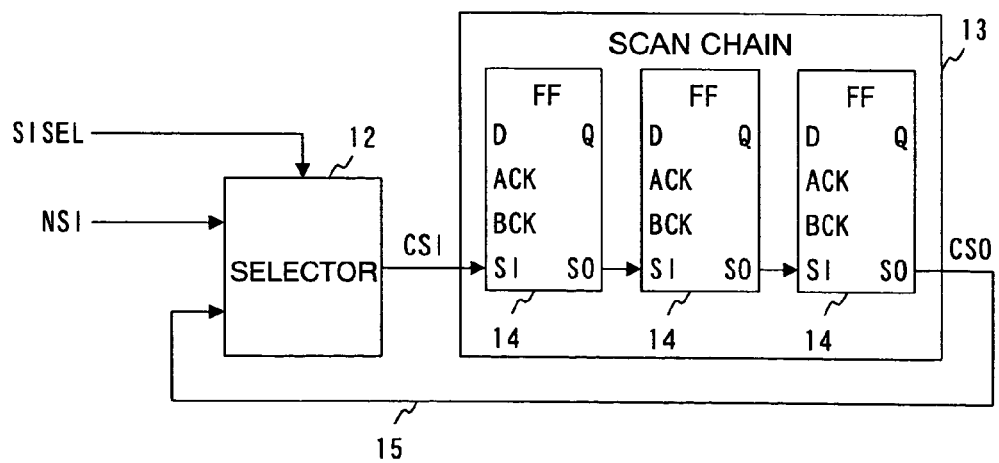
FIG. 11 is a block diagram showing one example of the configuration of a scan data section according to the second embodiment of the present invention.

First of all, reference will be made to the scan data section 103. FIG. 11 is a block diagram that shows one example of the configuration of the scan data section according to the second embodiment of the present invention. In FIG. 11, the same symbols as those in FIG. 2 designate the same or corresponding parts shown in FIG. 2, and an explanation thereof is omitted here. Though the pattern generation section 11 is connected to one input of the selector 12 in FIG. 2, the scan chain output data signal CSO is connected to one input of the selector 12 through a connecting line 15 in FIG. 11.

If the number of scan shifts is M×N with the assumption that the number of scan bits, which is the number of stages of the FFs, is M and an arbitrary integer is N, the internal state of the LSI circuit is restored to its internal state prior to the scan shifts by the above-mentioned scan data section 103.

Figure 12:
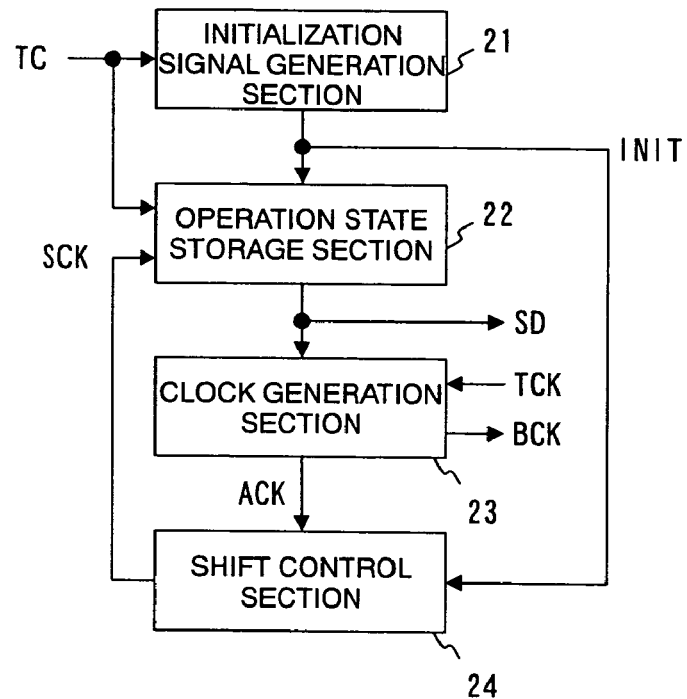
FIG. 12 is a block diagram showing one example of the configuration of a scan control section according to the second embodiment of the present invention.

Hereinbelow, reference will be made to the scan control section 104. In order to restore the internal state of the LSI circuit prior to a temperature rise operation thereof after the temperature rise operation has been done, it is necessary for the scan control section 104 to control the number of scan shifts according to the temperature rise operation in an accurate manner. FIG. 12 is a block diagram that shows one example of the configuration of the scan control section according to the second embodiment of the present invention. In FIG. 12, the same symbols as those in FIG. 5 designate the same or corresponding parts shown in FIG. 5, and an explanation thereof is omitted here. In FIG. 5, there is a path from the A-clock signal ACK of the clock generation section 23 to the clock signal SCK of the operation state storage section 22, but in FIG. 12, a shift control section 24 is inserted in this path, and an initialization signal INIT is input to the shift control section 24.

Figure 13:
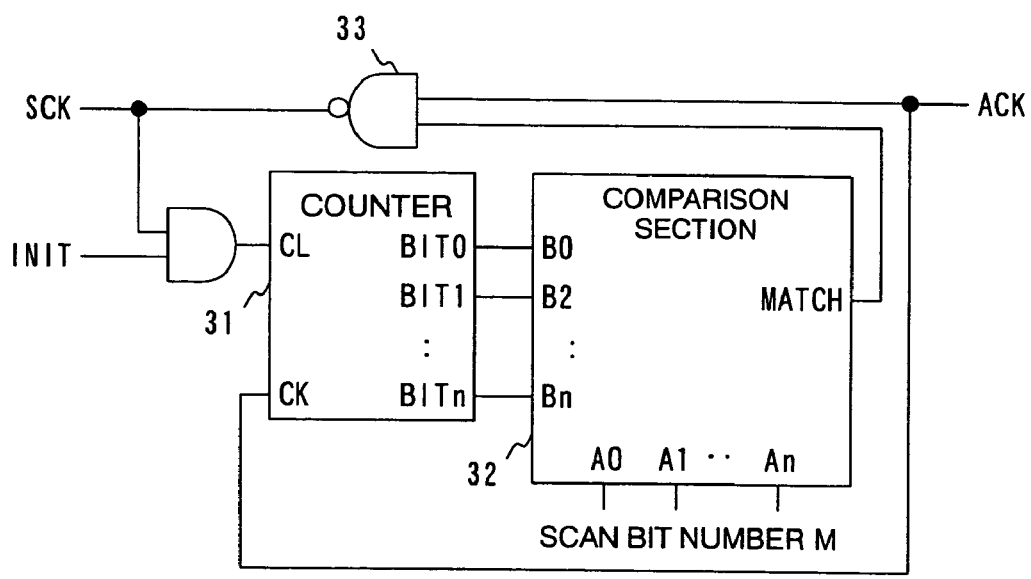
FIG. 13 is a block diagram showing one example of the configuration of a shift control section according to the second embodiment of the present invention.

FIG. 13 is a block diagram that shows one example of the configuration of the shift control section according to the second embodiment of the present invention. The shift control section 24 according to the second embodiment includes a counter 31, a comparison section 32 and a clock gate section 33. The clock gate section 33 is formed of a NAND. The counter 31 counts the number or frequency of clocks, i.e., the number of scan shifts. When the value of the counter coincides with a predetermined scan bit number M, the comparison section 32 clears the counter 31, and opens the clock gate section 33 so that the clock signal SCK is passed to the operation state storage section 22.

The operation state storage section 22 holds a temperature rise operation signal TC from the temperature rise control section 2 according to the clock signal SCK from the shift control section 24, and outputs it to the scan control section 104, so that the temperature rise operation signal TC held thereby is updated by a value input thereto only when the number of scan shifts coincides with M×N. Accordingly, the scan shift according to the temperature rise operation can be stopped when the temperature rise operation signal TC from the temperature rise control section 2 becomes OFF and at the same time when the number of scan shifts becomes M×N. Accordingly, it is possible to restore the internal state of the LSI circuit 101 to its state prior to the temperature rise operation, and to switch the operation thereof to the ordinary operation.

Embodiment 3

In a third embodiment of the present invention, consideration is given to the case where an LSI circuit uses a power saving mode, as in the second embodiment of the present invention. It is assumed that there is an offset of 0 or 1 in the internal state of the LSI circuit when the internal state of the LSI circuit prior to a temperature rise operation is reproduced or restored after the temperature rise operation has been done. In this case, reference is made to a temperature adaptive circuit that serves to prevent the temperature of the LSI circuit from being not raised due to insufficient switching thereof.

Figure 14:
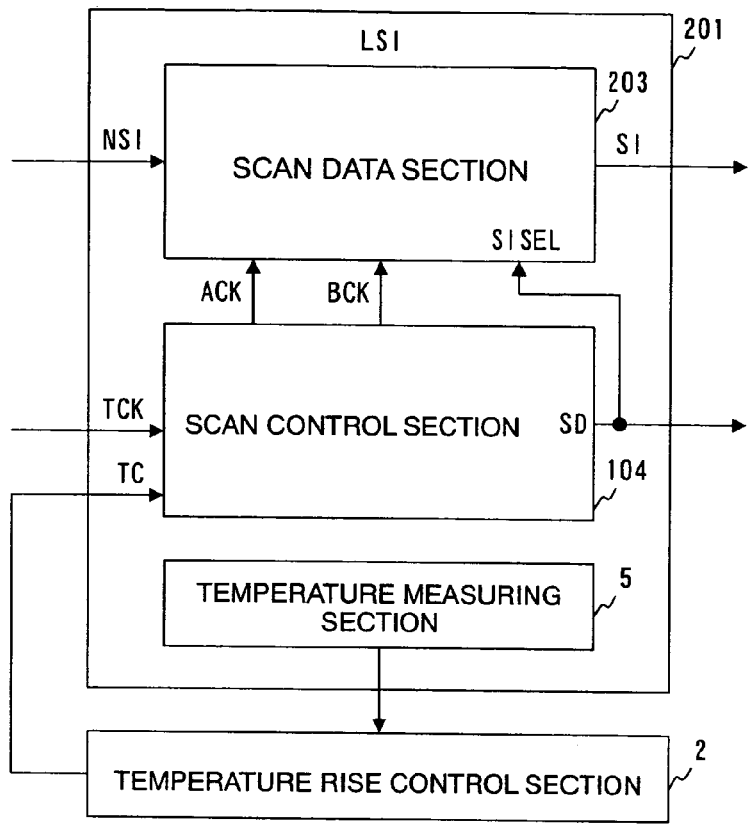
FIG. 14 is a block diagram showing one example of the configuration of a temperature adaptive circuit according to a third embodiment of the present invention.

FIG. 14 is a block diagram that shows one example of the configuration of a temperature adaptive circuit according to the third embodiment of the present invention. In FIG. 14, the same symbols as those in FIG. 10 designate the same or corresponding parts shown in FIG. 10, and an explanation thereof is omitted here. In the third embodiment of the present invention, an LSI circuit 201 is provided instead of the LSI circuit 101, and a scan data section 203 is provided instead of the scan data section 103.

Figure 15:
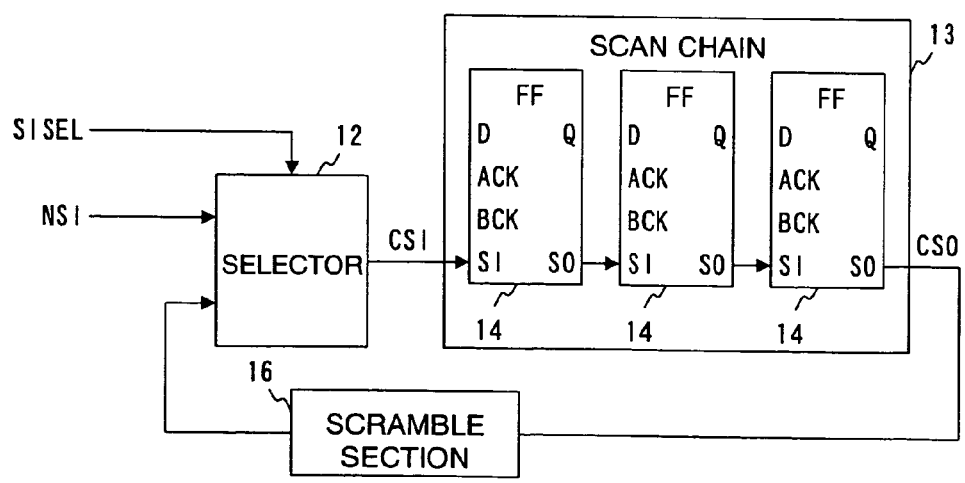
FIG. 15 is a block diagram showing one example of the configuration of a scan data section according to the third embodiment of the present invention.
Figure 16:
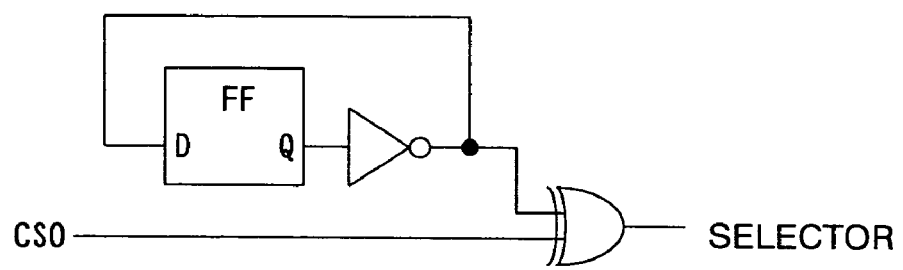
FIG. 16 is a block diagram showing one example of the configuration of a scramble section according to the third embodiment of the present invention.

FIG. 15 is a block diagram that shows one example of the configuration of a scan data section according to the third embodiment of the present invention. In FIG. 15, the same symbols as those in FIG. 11 designate the same or corresponding parts shown in FIG. 11, and an explanation thereof is omitted here. In FIG. 11, there is a path from the scan chain output data signal CSO to the selector 12, but in FIG. 15, a scramble section 16 is inserted in this path. The scramble section 16 serves to invert the scan chain output data signal CSO into two bits in one time by using a pattern similar to that generated by the pattern generation section of FIG. 3, and pass it to the selector 12. FIG. 16 is a block diagram that shows one example of the configuration of the scramble section according to the third embodiment of the present invention.

Here, let us assume that the number of scan bits, which is the number of stages of the FFs, is M and an arbitrary integer is N. In the case of M being an even number, when the predetermined number of scan shifts is set as M×2N, the internal state of the LSI circuit is restored to its internal state prior to the scan shifts by the operation of the scan data section 203. On the other hand, in the case of M being an odd number, when the predetermined number of scan shifts is set as M×4N, the internal state of the LSI circuit is restored to its internal state prior to the scan shifts by the operation of the scan data section 203. In addition, an offset of 0s or 1s in the internal state of the LSI circuit can be prevented, so that switching in the temperature rise operation can be done in an efficient manner, thus making it possible to raise the temperature of the LSI circuit.

Figure 17:
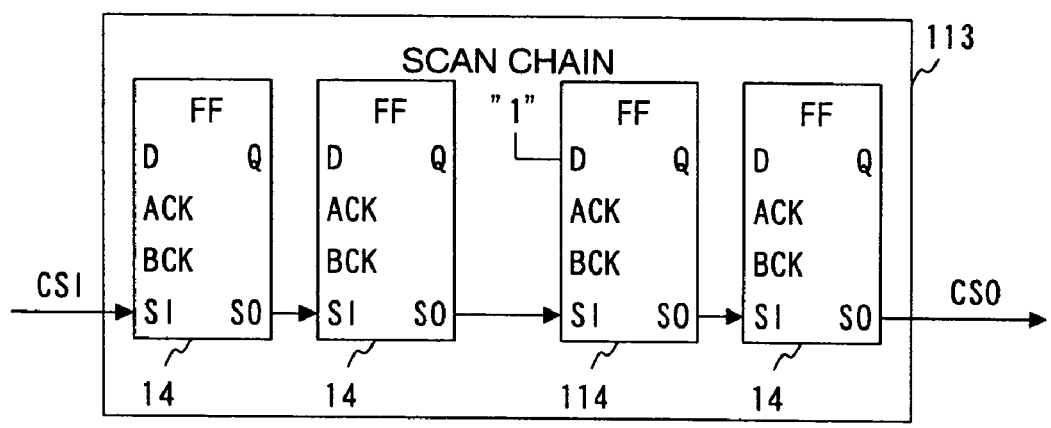
FIG. 17 is a block diagram showing another example of the configuration of a scan chain.

FIG. 17 is a block diagram that shows another example of the configuration of a scan chain. A scan chain 113 is formed by inserting a dummy FF 114, which always has its terminal D input with "1", into a range of the FFs in the scan chain 13 where "0" is prone to continue. Thus, when there is a high probability of a specific data pattern with the result that the operation rate of switching becomes low, it is possible to change the data pattern by means of insertion of such a dummy FF.

While the invention has been described in terms of preferred embodiments, those skilled in the art will recognize that the invention can be practiced with modifications within the spirit and scope of the appended claims.

What is claimed is:

1. A temperature adaptive circuit comprising:
    a circuit that selectively performs, based on an instruction, an ordinary operation, which is an operation in a temperature range where a normal operation is possible, or a temperature rise operation, which is an operation of raising its temperature; and
    a motion control section that outputs an instruction for either of said ordinary operation and said temperature rise operation to said circuit;
    wherein said circuit includes:
    a pattern generation section that generates a data pattern for said temperature rise operation;
    a selector that is input with said data pattern output by said pattern generation section as a first input, and with a data pattern for said ordinary operation input thereto from the outside as a second input, so that said first input and said second input are switched from each other in accordance with an instruction from the outside;
    a switching control section that switches said selector in accordance with an instruction from said motion control section;
    a scanning chain that operates a plurality of flip flops based on an output of said selector; and
    a temperature measuring section that measures the temperature of said circuit, and outputs it to said motion control section;
    wherein said pattern generation section outputs data pattern, in which a bit is inverted once per two bits, in response to an output of said scan chain.

2. The temperature adaptive circuit as set forth in claim 1, wherein in case of the number of scan bits being an even number, said switching control section switches said selector into said second input when said motion control section instructs the termination of the temperature rise operation and when the number of scan bits of said scan chain becomes 2N (N is an integer) times the number of scan shifts of said scan chain.

3. The temperature adaptive circuit as set forth in claim 1, wherein in the case of the number of scan bits being an odd number, said switching control section switches said selector into said second input when said motion control section instructs the termination of the temperature rise operation and when the number of scan bits of said scan chain becomes 4N (N is an integer) times the number of scan shifts of said scan chain.

4. The temperature adaptive circuit as set forth in any of claims 1 through 3, wherein said scan chain inserts a dummy flip flop for outputting a fixed value into said flip flops at a position thereof at which there is a high probability of a specific data pattern.

* * * * *